Dec. 24, 1963 E. R. FULWILER ETAL 3,115,552

TELEPHONE SWITCHING SYSTEM

Filed Nov. 28, 1961 7 Sheets-Sheet 1

INVENTORS: E. R. FULWILER
R. L. HAYES
E. D. MASUCCI
W. M. WILSON

BY John C Albrecht

ATTORNEY

Dec. 24, 1963 E. R. FULWILER ET AL 3,115,552

TELEPHONE SWITCHING SYSTEM

Filed Nov. 28, 1961 7 Sheets-Sheet 3

Dec. 24, 1963 E. R. FULWILER ETAL 3,115,552

TELEPHONE SWITCHING SYSTEM

Filed Nov. 28, 1961 7 Sheets-Sheet 5

Dec. 24, 1963 E. R. FULWILER ETAL 3,115,552

TELEPHONE SWITCHING SYSTEM

Filed Nov. 28, 1961 7 Sheets-Sheet 7

United States Patent Office 3,115,552

Patented Dec. 24, 1963

3,115,552

TELEPHONE SWITCHING SYSTEM

Edward R. Fulwiler, Sherman Oaks, Calif., Richard L. Hayes, Red Bank, N.J., Eugene D. Masucci, Columbus, Ohio, and Warren M. Wilson, Studio City, Calif., assignors to American Telephone and Telegraph Company, New York, N.Y., a corporation of New York Filed Nov. 28, 1961, Ser. No. 155,290

29 Claims. (Cl. 179—18)

This invention relates in general to telephone switching systems and, more particularly, to the transfer of calls within such systems.

Since the realization of automatic telephone switching apparatus, major efforts have been exerted to permit customers to directly dial a called destination without the intervention of a manual operator. Direct distance dialing has been extended to most of the United States and a more recent innovation permits direct inward dialing to extensions of a private branch exchange. Direct inward dialing serves to speed service, reduce equipment holding time, and to improve the transmission of a connection; however, with the advent of direct inward dialing, a problem arises concerning the transfer of incoming calls within a PBX. A number of arrangements have been devised which provide trunk appearances at a PBX switchboard and permit a called extension to alert the switchboard operator through the trunk appearance and, subsequently, the operator at the switchboard establishes a new connection between the incoming trunk and the extension to which the call is to be transferred. Such arrangements are obviously slow in that they require the intervention of an operator who may or may not be free to handle a call and are costly of both equipment, in that equipment holding time is increased, and of personnel, in that operators must be provided to handle such traffic.

Accordingly, it is an object of this invention to provide automatic customer transfer of an inward dialed call from a called extension on a switchboard position to a desired extension within the private branch exchange.

It is another object of this invention to permit a called subscriber or operator to dismiss a transfer request if the extension to be transferred to is busy or does not answer and to initiate succeeding transfer requests.

It is another object of this invention to establish for a predetermined period of time a three-way connection between the incoming trunk, the originally called extension or switchboard position, and the extension to which the call is to be transferred so that the person requesting the transfer may be assured that the transfer has been effected.

Advantageously, in accordance with this invention the incoming trunks to a private branch exchange are equipped to recognize a transfer request and apparatus is provided to record the information relating to the transfer request and to subsequently establish a connection to the extension to which the transfer is to be made.

If, during the course of a connection between an incoming trunk and a PBX extension, it is determined that the call is to be transferred to another extension of the private branch exchange, the subscriber at the originally called extension initiates a transfer by dialing a prefix "1."

It is possible to designate extensions within the PBX which are permitted to transfer calls. If a transfer request originates with an extension entitled to this service, the incoming trunk will recognize the service request and will, in turn, bid for a transfer trunk.

Action is then undertaken to release the original connection between the incoming trunk and the called extension and to establish a new connection between the incoming trunk and the originally called extension through the transfer trunk. The incoming trunk has three transmission outlets. In addition to the normal connections to the distant office and the trunk link frame, the incoming trunk has an auxiliary transmission path to a group of transfer trunks through a transfer trunk link. The first connection directly between the primary transmission path of the incoming trunk and the originally called extension is released to free the trunk link frame appearance of the incoming trunk. A second connection is established between the incoming trunk and the originally called extension through the transfer trunk and a transfer register is attached to the transfer trunk to accept dialing information from the originally called PBX extension. The transfer register, when attached, returns dial tone and indicates that it is prepared to register the directory number of the extension to which the call is to be transferred. The originally called subscriber then proceeds to dial the necessary directory information.

Transfer is generally permitted only within a PBX and not between PBX's; therefore, as the transfer request is being registered a check is made to determine whether or not the transfer as requested may be completed. If the transfer requested is permitted, a connection is established between the primary transmission path of the incoming trunk and the extension to which the transfer is to be effected. If the transfer extension answers, a three-way connection is established between the incoming trunk, the originally called extension, and the transfer extension to permit verification of the transfer. The three-way connection is held for a predetermined period in the order of thirty seconds after which the transfer trunk and the originally called extension are released and the call may proceed between the incoming trunk and the transfer extension.

If the extension to be transferred to did not answer or was busy, the subscriber at the originally called extension may dial a subsequent "1" to dismiss the transfer request and may subsequently dial an initial "1" to establish another transfer request.

In accordance with one feature of this invention, subscribers served by the extensions of a private branch exchange having inward dialed service may effect a transfer to another extension of the private branch exchange without the intervention of a manual operator.

In accordance with another feature of this invention, a request to transfer may be dismissed if the extension to be transferred to does not answer or is busy.

In accordance with another feature of this invention, a momentary three-way connection is established between an incoming trunk, an originally called extension, and a transfer extension to permit the subscriber at the originally called extension to verify that the appropriate transfer has been effected.

In accordance with another feature of this invention, the transfer apparatus is released from a call after a transfer has been effected and may be employed by other requests for transfer.

In accordance with another feature of this invention, extensions of a PBX may be selectively permitted to initiate transfer requests and discrimination between extensions afforded this feature and other extensions is on the basis of the ringing combination assigned to the extension.

The above and other objects and features of this invention can best be understood with reference to the drawing in which.

This invention is described in the context of a crossbar telephone switching system as shown in A. J. Busch Patent 2,585,904, which issued February 19, 1952. The invention can best be understood without reference to the massive detail of the Busch patent, and the above-noted Busch patent is incorporated in this disclosure by reference. This description will be directed to the manner in which the subject invention departs from the teachings and showings of the Busch specification and drawing. The operation of this invention may be understood by an explanation of FIG. 1 in general terms and by subsequent description of the details of FIGS. 2 through 7.

*General Descripiton*

Figure 1:
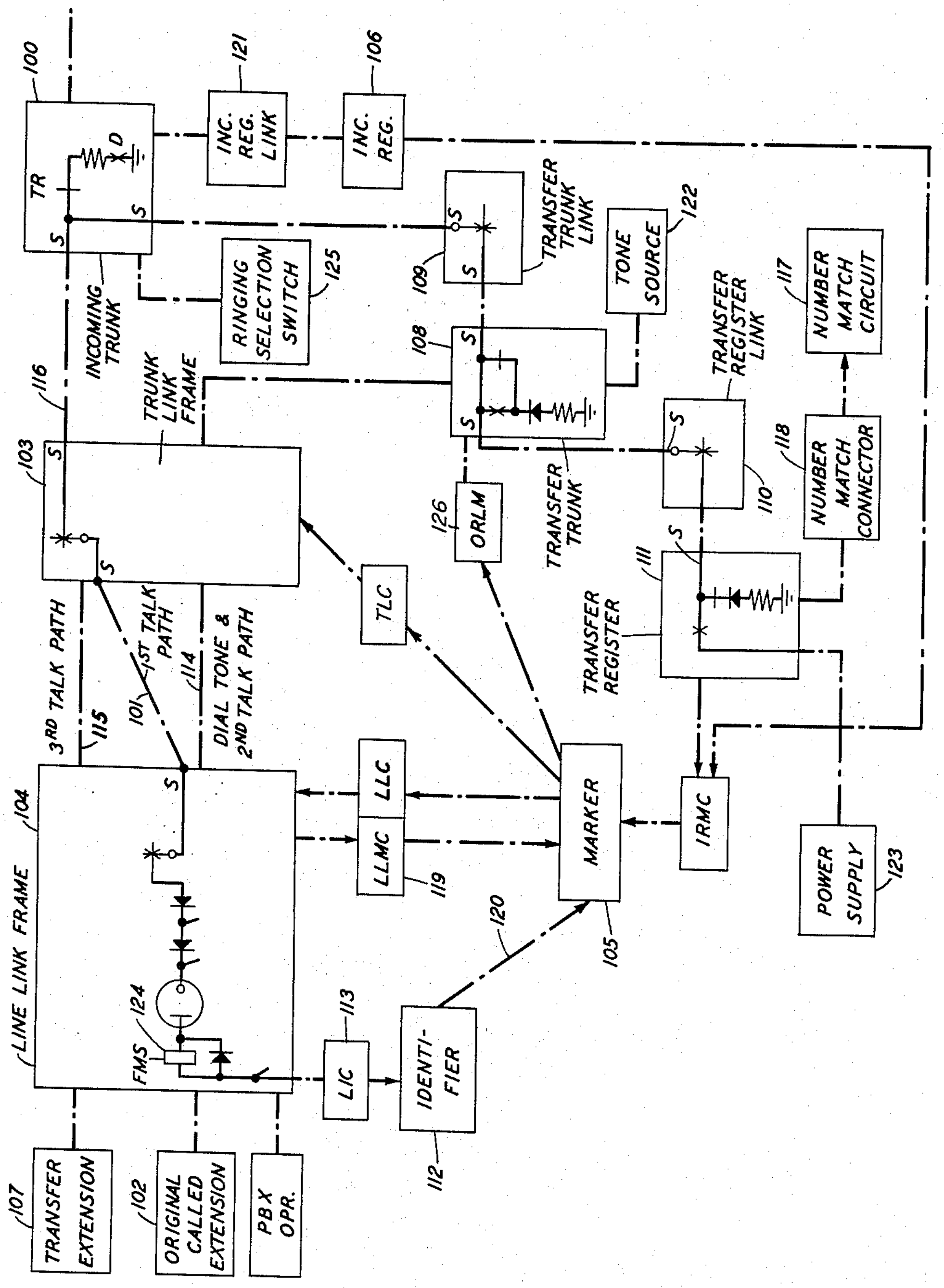
FIG. 1 is a block diagram of a telephone switching system in accordance with this invention.

In FIG. 1 there is shown a crossbar telephone switching system wherein an incoming trunk 100 is connected through a first talking path 101 to an originally called extension 102. The incoming trunk 100 terminates on the trunk link frame 103 and the originally called extension 102 terminates on the line link frame 104. As set forth in the previously noted Busch patent, such as incoming call is established under control of the marker 105 in accordance with call signaling information which is originated with the incoming trunk 100 and registered in the incoming register 106.

After the connection between the incoming trunk 100 and the originally called extension 102 is established via the first talking path 101, it is determined by the parties to the connection that the incoming call is to be transferred to the transfer extension 107. In this one illustrative example the party at the originally called extension 102 dials an initial "1" which is recognized by the incoming trunk 100 as a request to effect a transfer to another extension. Upon recognizing a transfer request, the incoming trunk 100 bids for a transfer trunk such as 108 which is attached through a transfer trunk link 109. The transfer trunk 108, in turn, through the transfer register link 110, bids for a four-digit transfer register such as 111. After the transfer register 111 becomes attached to the transfer trunk 108, a discrete A.C. marking potential is passed from the transfer register 111 to the line link frame appearance of the originally called extension over the sleeve conductor, the integrity of which is maintained over a path which includes the transfer register link 110, the transfer trunk 108, the transfer trunk link 109, the incoming trunk 100, the trunk link frame 103, the first talking path 101 and the line link frame 104. The discrete A.C. potential is detected at the line link frame 104 and a frame start signal causes the line link frame 104 to make a bid for the identifier 112 and for the marker 105. The identifier 112 comprises a pattern of relays which, in accordance with a bid from the line link frame 104, is attached to the sleeve conductors of the lines appearing on the line link frame 104 through the line identifier connector 113. The identity of the line so marked is established by means of the identifier 112 and is passed to the marker 105 to permit establishment of a connection between the originally called extension 102 and the incoming trunk 100 over a path, labeled second talking path 114, and the transfer trunk 108.

As previously noted, the incoming trunk 100 has three transmission outlets to permit a simultaneous connection between the distant end of the incoming trunk 100, the originally called subscriber extension 102 via the second talking path 114, the transfer trunk 108 and the transfer trunk link 109 and an extension to which the call is to be transferred via the third talking path 115. The marker 105, in accordance with information obtained from the identifier 112 and information obtained from the transfer register 111 concerning the identity of the transfer trunk 108, establishes the second talking path 114 by selectively controlling the line link frame 104 and the trunk link frame 103. After this connection has been established, the first talking path 101 may be broken to free the trunk link frame appearance 116 of the incoming trunk 100. After the second talking path 114 is established, dial tone is returned to the originally called extension 102 from the transfer register 111. Upon receipt of dial tone, the subscriber at the originally called extension 102 may dial the number of the extension 107 to which the call is to be transferred. During registration of a four-digit number, a check is made by means of the number match circuit 117 which is attached to the transfer register 111 by the number match connector 118 to assure that the extension to which the call is to be transferred is, in fact, within the same PBX. If the requested transfer is appropriate, the marker 105 receives a bid from the transfer register 111 and subsequently selectively controls the line link frame 104 and the trunk link frame 103 to establish the third talking path 115 between the transfer extension 107 and the incoming trunk 100 via the trunk link frame appearance 116. If the extension 107 to be transferred to fails to answer the transfer call or if the extension is found to be busy, the subscriber at the originally called extension 102 may dial a subsequent digit "1" to release the third talking path 115 and to reset the transfer trunk 108, and the incoming trunk 100 to accept a subsequent transfer request. If the transfer extension 107 answers, a momentary three-way transmission connection is established between the originally called extension 102, the incoming trunk 100, and the transfer extension 107; however, unless the originally called extension 102 hangs up, the second talking path 114 will be released approximately thirty seconds after the transfer extension 107 has been answered and the transfer trunk 108 and its associated circuitry will also be released.

*Detailed Description*

Figure 2:
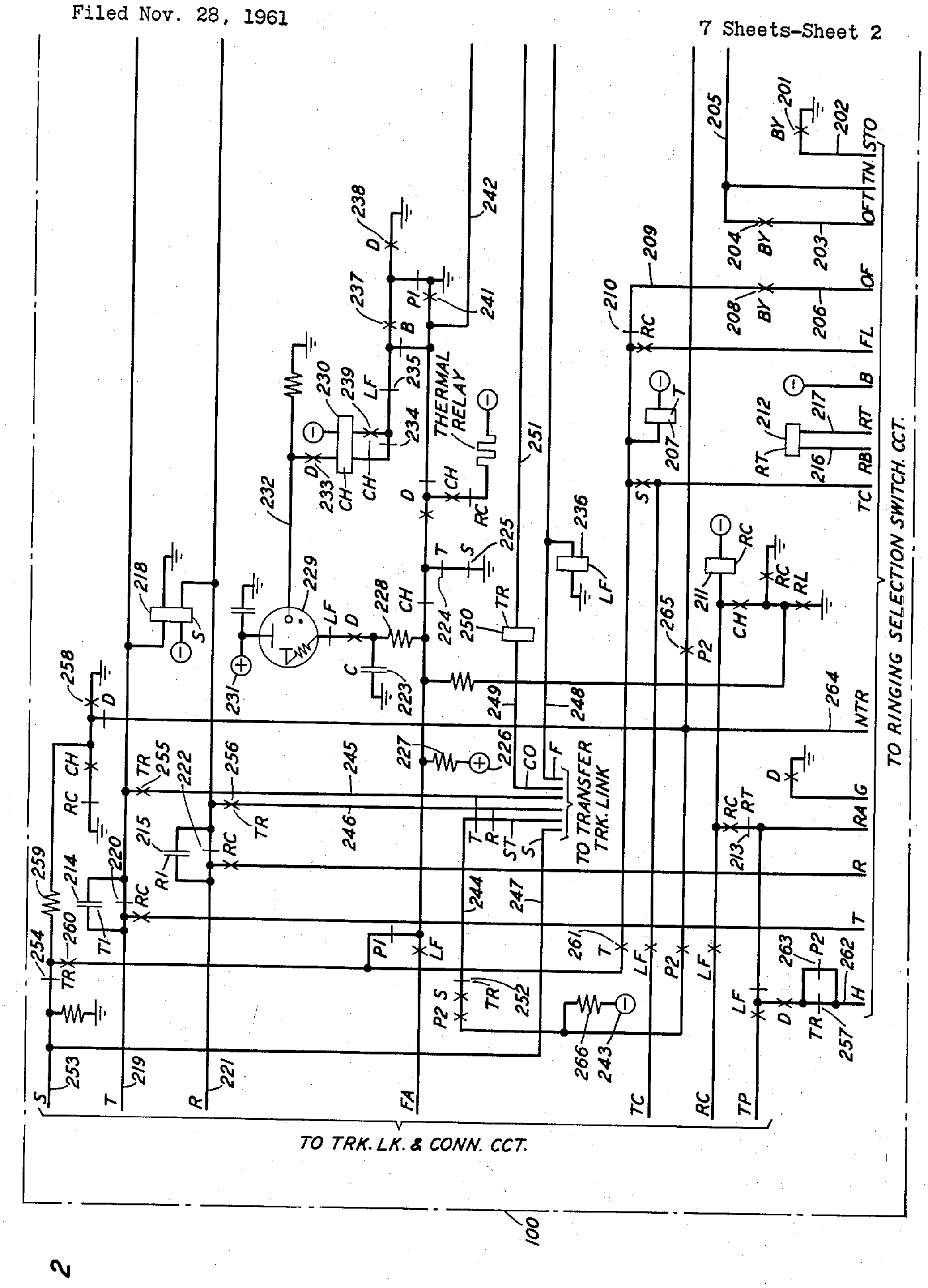
FIGS. 2 and 3 are a schematic representation of an incoming trunk employed in FIG. 1.
Figure 3:
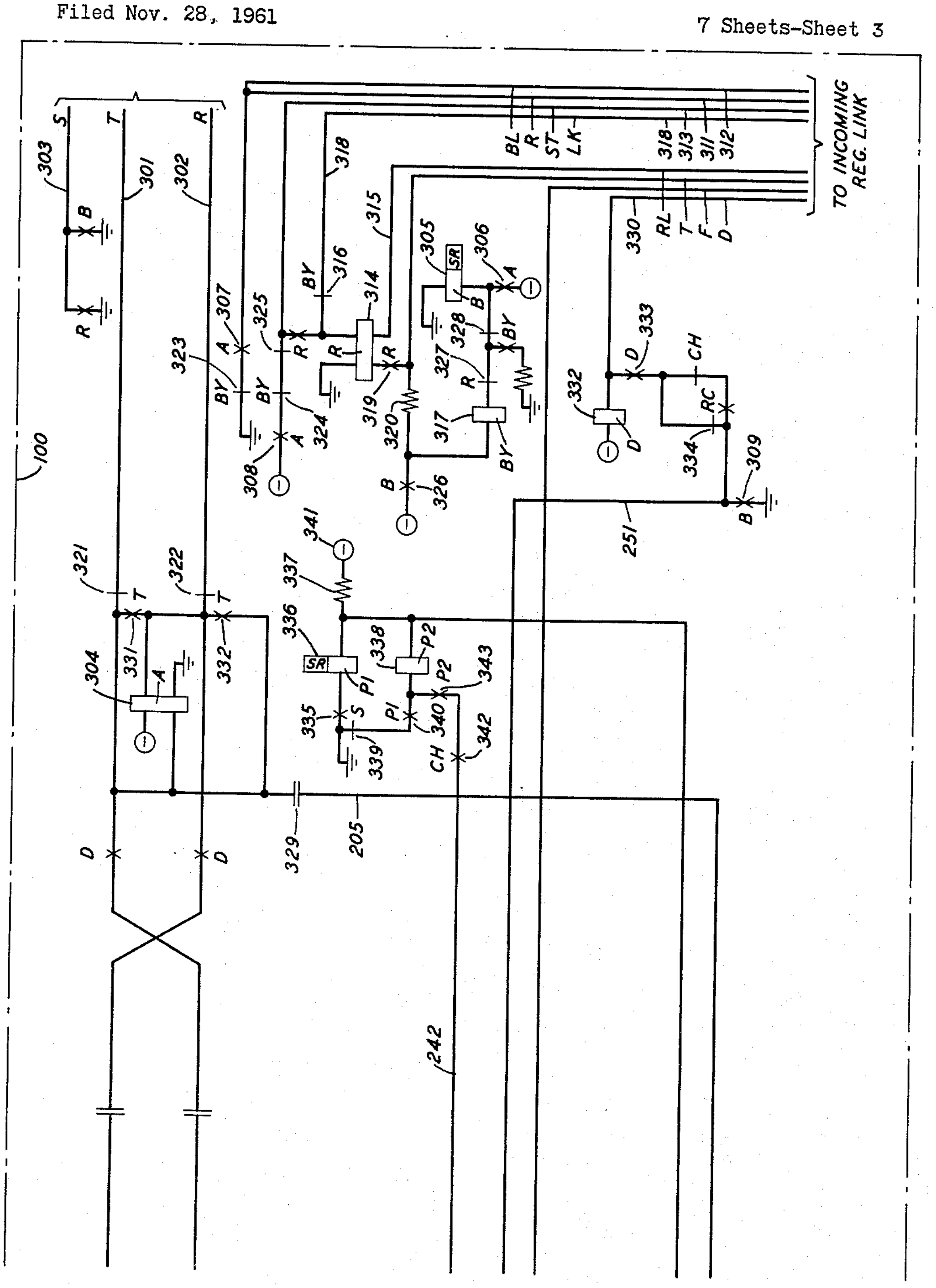
Figure 4:
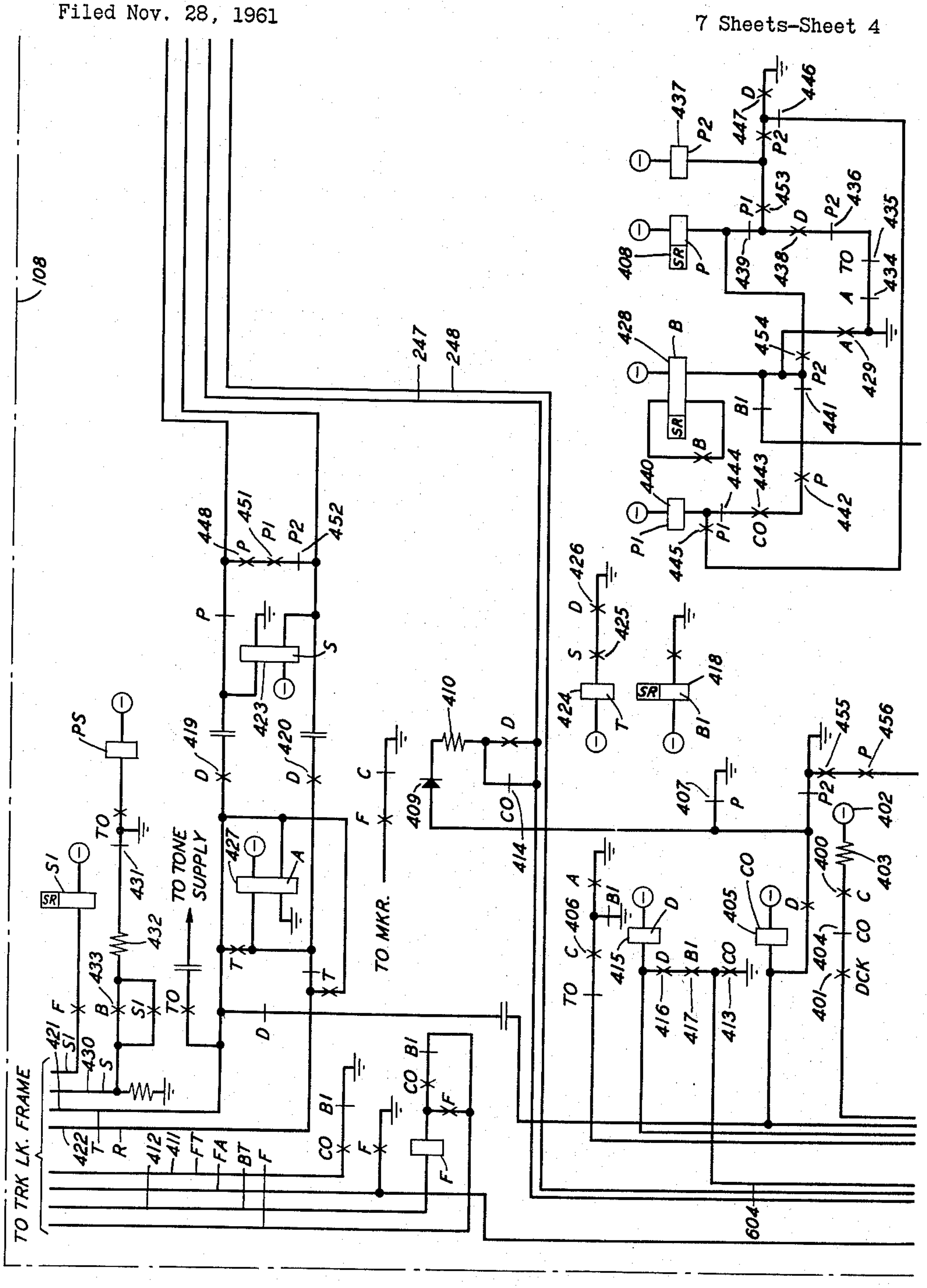
FIGS. 4 through 7 are a schematic representation of a transfer trunk employed in FIG. 1.
Figure 5:
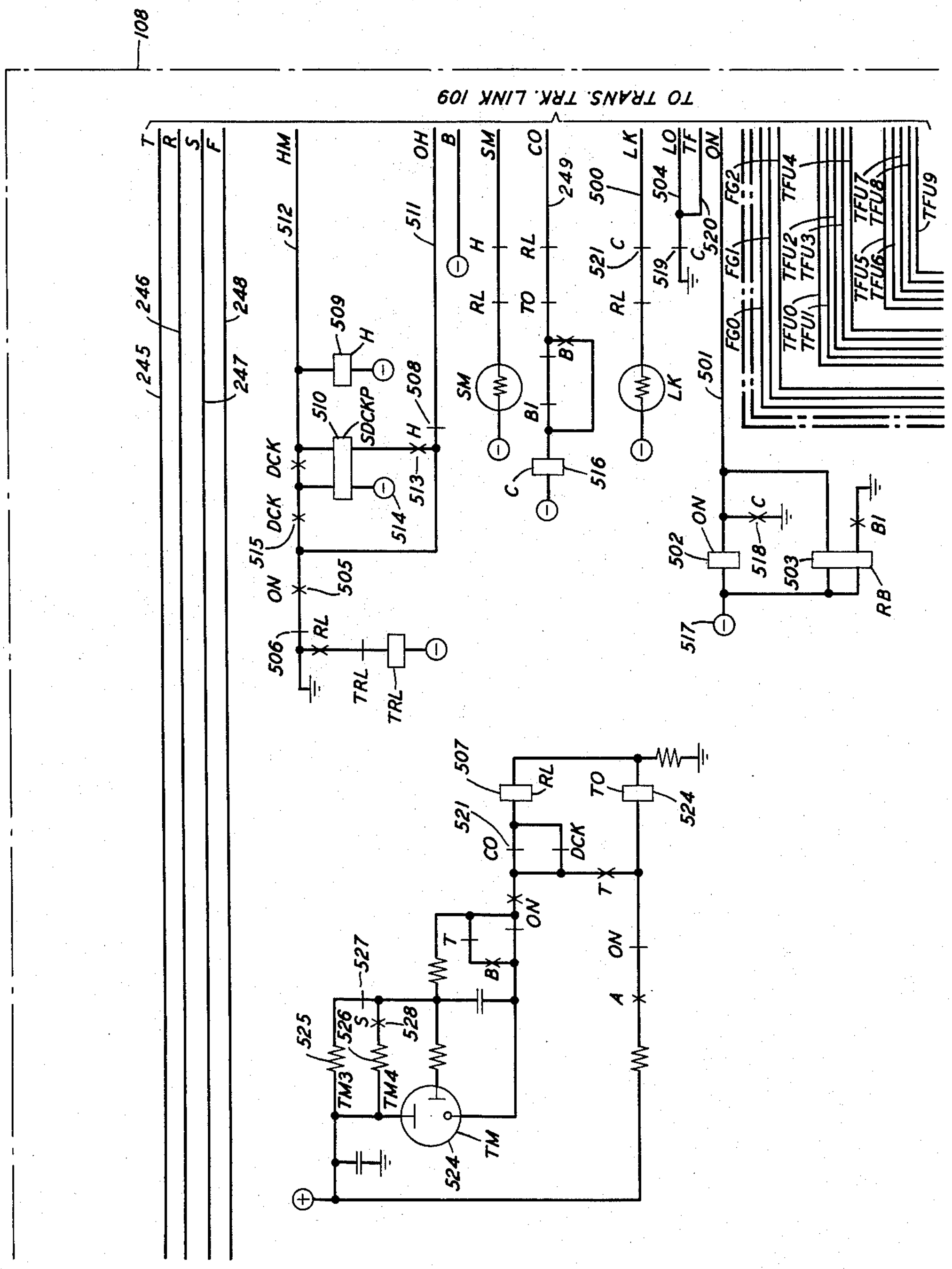
Figure 6:
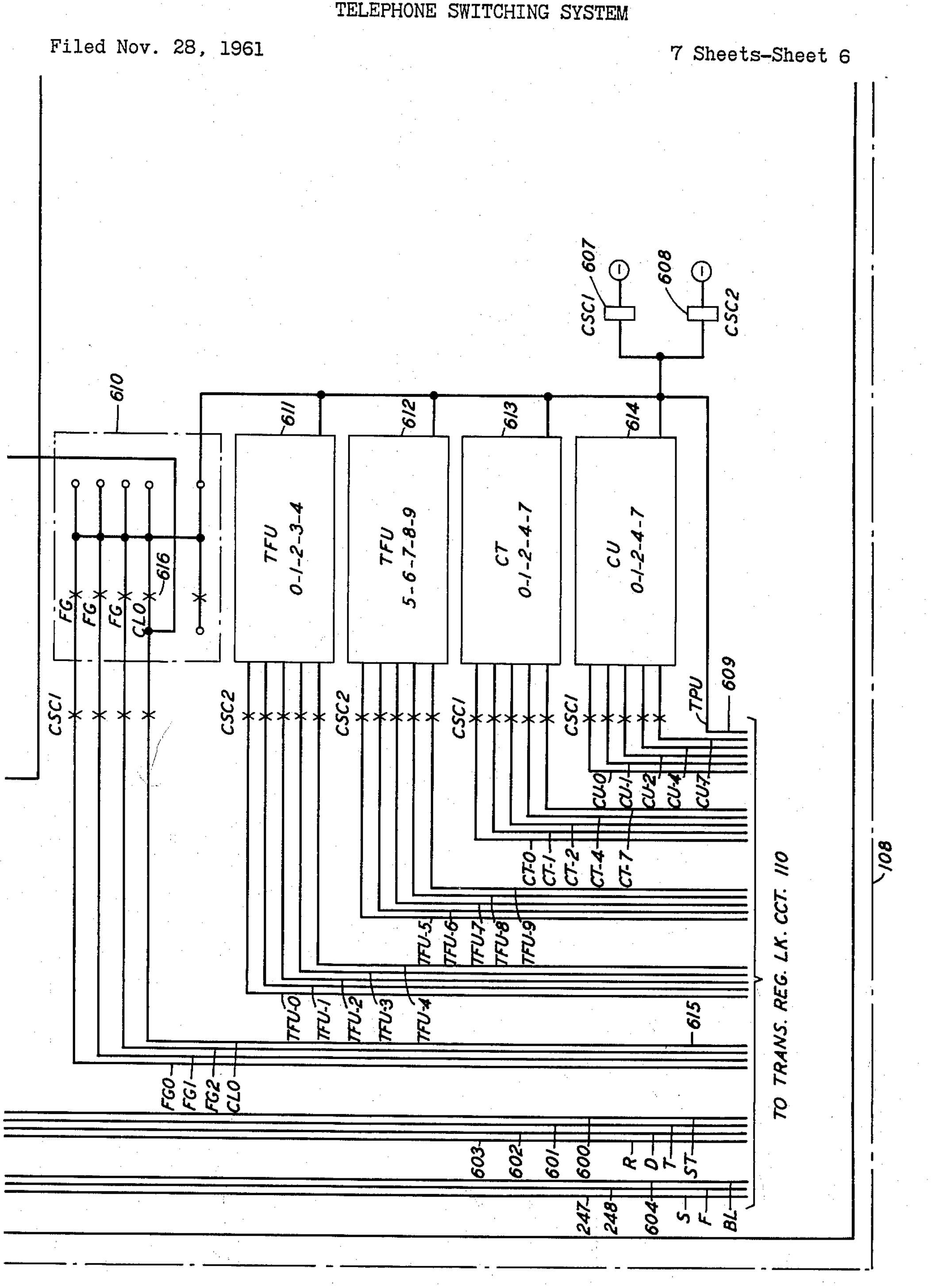

A more complete understanding of the system of this invention may be obtained through a discussion of FIG. 1 and the details thereof which are shown in FIGS. 2 through 7. FIGS. 2 and 3 show the principal details of the incoming trunk 100.

*An Incoming Call*

The T, R and S conductors 301, 302 and 303 connect to an auxiliary trunk circuit for transmission to a distant office on a two-wire basis or to the banks of a step-by-step selector directly on a three-wire basis. The incoming trunk 100 is seized by a short on the tip and ring conductors 301 and 302. The short serves to operate the A relay 304 over a path which includes ground, the lower winding of the A relay 304, break contact 321 of the T relay 207, the tip conductor 301, the short from the distant office, ring conductor 302, break contact 322 of the T relay 207, and the upper winding of the A relay 304 to negative battery. The operation of the A relay 304 prepares a pulsing path to the register by grounding the R conductor 311 and the BL conductor 312 over a path which includes ground, the break contact 323 of the BY relay 317 and the make contact 307 of the A relay 304. Operation of the A relay 304 also places negative battery on the ST conductor 313 over a path which includes the make contact 308 of the A relay 304, the break contact 324 of the BY relay 317 and the break contact 325 of the R relay 314 and, in addition, closure of the make contact 306 of the A relay 304 serves to energize the operating winding of the B relay 305.

After a path becomes available between the incoming trunk 100 and the incoming register 106, the R relay 314 is operated over a path which includes the RL conductor 315, the primary winding of the R relay 314, the break contact 316 of the BY relay 317 and the LK conductor 318, the path being completed in the incoming register circuit. The R relay 314, in turn, locks through its secondary winding over a path which includes ground, the secondary winding of the R relay 314, the make contact 319 of the R relay 314, resistor 320, make contact 326 of the B relay 305 to negative battery. The A relay 304 follows dial pulsing from the distant office and if dialing is initiated before a path to the register is available, the A relay 304 will release prior to the operation of the R relay 314. In this event, the shunt path through the make contact 306 of the A relay 304 will be opened and the BY relay 317 will operate over a path which includes negative battery, the make contact 326 of the B relay 305, the winding of the BY relay 317, the break contact 327 of the R relay 314, the break contact 328 of the BY relay 317, the winding of the B relay 305 to ground. The BY relay 317 thus operates in series with the B relay 305. Operation of the BY relay 317 places ground through the make contact 201 of the BY relay 317 on the STO conductor 202 which is the start conductor to the 120 i.p.m. interrupter circuit; connects overflow tone from conductor 203 via the make contact 204 of the BY relay 317, conductor 205, capacitor 329 to the tip conductor 301 of the trunk 100; and connects interrupted ground from conductor 206 to the winding of the T relay 207 and thence to negative battery. The remainder of the path for operating the T relay 207 includes the make contact 208 of the BY relay 317, conductor 209, and the break contact 210 of the RC relay 211. The T relay 207 follows the interrupted ground signals on conductor 206 and thereby transmits reverse battery supervision to the distant office. This is accomplished by way of the transfer contacts 321, 322, 331 and 332 of the T relay 207.

If pulsing begins after a register is properly attached, relay R 314 will operate and lock as previously described, thereby transferring control of the register start conductor 313 to the battery which originates in the register and which appears on the LK conductor 318. The B relay 305, when operated, places ground on the sleeve conductor 303 to hold the connection from the auxiliary trunk circuit or the selector banks. After registration is completed, the register returns ground over the D conductor 330 to operate the D relay 332 which, in turn, locks over a path which includes the make contact 333 of the D relay 332, the break contact 334 of the RC relay 211, and the make contact 309 of the B relay 305 to ground.

After registration is completed, the marker 105 associates itself with the incoming trunk 100, and in a manner similar to that described in the above-noted A. J. Busch patent proceeds to establish a connection through the trunk link frame 103 and the line link frame 104 from the incoming trunk 100 to the originally called extension 102. This connection includes the trunk conductors 116, a path through the trunk link frame 103 between the conductors 116 and the first talk path 101, and a connection through the line link frame 104 between the first talk path 101 and the line of the originally called extension 102. The marker 105 proceeds to cause ringing current to be applied to the called line and a small amount of ringing current is returned to the calling subscriber through the T1 capacitor 214 and the R1 capacitor 215.

When the called extension is answered, the RT relay 212 is operated over a path which includes the RB and RT conductors 216 and 217, and the path is completed in the ringing selection switch which is not shown in detail. Operation of the RT relay 212 opens a holding path for the RC relay 211 when the break contact 213 of the RT relay 212 becomes operated. Release of the RC relay 211 completes a path for opertaing the S relay 218 over a path which includes ground, the upper winding of the S relay 218, the break contact 220 of the RC relay 211, the tip conductor 219, the short from the called subscriber extension, the ring conductor 221, the break contact 222 of the RC relay 211, and the lower winding of the S relay 218 to negative battery.

The S relay 218 when operated supplies talking battery to the called subscriber and causes the P1 relay 336 to operate over a path which includes ground, the make contact 335 of the S relay 218, the winding of the P1 relay 336, resistor 337 to negative battery. Further, operation of the S relay 218 completes a path for operating the T relay 207. Operation of the T relay 207 reverses the tip and ring polarity to the originating end to indicate an answer or off-hook condition at the called extension.

Operation of either the S relay 218 or the T relay 207 removes the shunt from the C capacitor 223 by opening the S relay break contact 224 or the T relay break contact 225. The C capacitor 223 may then charge over a path which includes positive potential source 226, resistor 227, and resistor 228 return to ground. The time constant of this capacitor resistor charging circuit is such that it takes from two to five seconds for the gas tube 229 to break down and thereby cause operation of the CH relay 230.

The operating path for the CH relay 230 includes the positive potential source 231, the gas tube 229, conductor 232, the make contact 233 of the D relay 332, the winding of the CH relay 230, the break contact 234 of the CH relay 230, the break contact 235 of the LF relay 236, the make contact 237 of the B relay 305, the make contact 238 of the D relay 332 to ground. Relay CH when operated: (1) locks operated through its make contact 239; (2) extinguishes the gas tube 229 when the break contact 234 is operated; (3) prepares a circuit for timed release of the trunk; and (4) prepares a path for subsequent operation of the P2 relay 338 as will be later described with regard to the dialed transfer of a call.

In the event that a call is completed without utilization of the dial transfer feature, either the calling or called subscriber may initiate the disconnect and the trunk 100 will be released and subsequently the connections through the trunk link frame 103 and the line link frame 104 will be released.

*Dial Transfer*

If the subscriber at the called PBX extension 102 elects to transfer an incoming call to another PBX extension, a digit "1" is dialed which pulses the S relay 218. Release of the S relay 218 closes the operating path for the P2 relay 338. This path includes ground, the break contact 339 of the S relay 218, the make contact 340 of the P1 relay 336, the winding of the P2 relay 338 and resistor 337 connected to negative potential 341.

As previously noted, it is possible to deny transfer service to particular extensions of the PBX or, putting it in other terms, it is possible to select by prior assignment the PBX extensions which are afforded transfer service. If the extension at which the subscriber has initiated a transfer request is not entitled to transfer service, ground will be returned from the ringing selection switch on the NTR conductor 264. Ground on the NTR conductor 264 shunts the potential source 341 through resistor 337 and causes the P2 relay 338 to immediately release and also shunts down the potential source 243 through the resistor 266 and thereby grounds the ST conductor 244 to the transfer trunk link. The P2 relay 338 does not reenergize as the S relay 218 has reoperated and the operating path for the P2 relay is destroyed.

In the event that the extension from which the subscriber is requesting service is entitled to transfer service, the P2 relay 338 locks operated to ground through the make contact 241 of the P1 relay 336, conductor 242, the make contact 342 of the CH relay 230, and the make contact 343 of the P2 relay 338. After the digit "1" has been dialed, the S relay 218 reoperates over the loop from the originally called subscriber and thereby completes a path from the negative potential source 243 to the ST conductor 244 which comprises a bid to the transfer trunk link 109. In response to the battery signal of the ST conductor 244 the transfer trunk link 109 proceeds to connect an idle transfer trunk such as 108 to the incoming trunk 100 via the transfer trunk link 109. The transfer trunk link 109 connects the T, R, S, F and CO conductors 245, 246, 247, 248 and 249 directly to the transfer trunk 108. When the transfer trunk 108 is attached, it applies battery to the CO conductor 249 and causes the TR relay 250 to operate to ground over conductor 251, the make contact 309 of the B relay 305 to ground.

Operation of the TR relay 250; (1) removes battery from the ST conductor 244 when the break contact 252 is operated; (2) transfers control of the sleeve conductor 253, which is connected to the originally called extension 102, from the incoming trunk 100 to the transfer trunk 108 when the break contact 254 of the TR relay 250 is operated; (3) through operation of the make contacts 255 and 256 connects the tip and ring conductors of the trunk 100 to the tip and ring conductors of the transfer trunk 108; (4) opens the break contact 257 and thereby releases the hold magnet in the ringing selection switch; and (5) provides the locking path for the T relay 207 during the transfer operation. This locking path includes ground, the make contact 258 of the D relay 332, resistor 259, the make contact 260 of the TR relay 250, the make contact 261 of the T relay 207, and the winding of the T relay 207 to negative potential.

*Transfer Trunk Operation*

The detailed operation of the transfer trunk link 109 is not described herein as this link operates in the same manner as an incoming register link such as 121, the operation of which is fully described in the Busch patent. Grounding of the ST conductor 313 as described with respect to the operation of the incoming trunk initiates seizure of a transfer trunk such as 108. Action within the transfer trunk link 109 closes ground through to the trunk link frame number conductors, FG0–FG2 and TFU0–TFU9 of FIG. 5, for operation of one of the FG0, 1 or 2 relays, 701, 702, 703 respectively, and operation of one of the TFU0 through 9 relays 704 in the transfer trunk 108. This information, which comprises the number of the trunk link frame on which the incoming trunk is terminated, is stored in the transfer trunk 108 to permit subsequent connection of the transfer extension such as 107 and the incoming trunk 100. The transfer trunk link 109 locks to resistance battery on the LK conductor 500. The transfer trunk link 109 also places ground on the ON conductor 501 which causes the ON relay 502 and the RB relay 503 to operate in parallel. The RB relay 503 connects resistance battery over the RB 0–7 conductors to each of the link horizontal groups as a transfer trunk busy indication. Transfer trunk link RB relays (not shown herein) operate in each of the horizontal groups except the one in which the call originated. In this group the RB relay 503 is prevented from operating by a shunting ground to the LO lockout conductor 504.

The transfer trunk ON relay 502 provides off normal ground to various parts of the trunk circuit and closes a path to start the RL release timer which times the functions of the link circuit and the seizure of a transfer register 111.

The ON relay 502, through its make contact 505, closes ground through the break contact 506 of the RL relay 507, the break contact 508 of the H relay 509 to the OH conductor 511 to the transfer trunk link 109 where it is extended through the operated select magnet off normal contacts and through the operated link TP relay (not shown) to operate the hold magnet associated with the incoming trunk 100.

When the cross points in the transfer trunk link 109 close, the hold magnet operated ground is extended over the HM conductor 512 to cause operation of the H relay 509. The H relay 509 in operating closes a path to place the low resistance primary winding of the DCK relay 510 in series with the HM conductor 512 and the ground potential which was previously extended to the OH conductor 511. The break contact 508 and the make contact 513 of the H relay 509 comprise a continuity transfer, that is, the make contact 513 closes before the break contact 508 opens. The DCK relay 510, which is employed to detect double connections, locks operated over its high resistance secondary winding from the negative potential source 514 through the make contact 515 of the DCK relay 510, through make contact 505 of the ON relay 502 and the break contact 506 of the RL relay 507 to ground. Operation of the DCK relay 510 ensures that a double connection does not exist as, if there were a double connection, a solid ground would have been previously connected to the HM conductor 512; therefore, the DCK relay 510 would have been shunted, it would not have operated. Failure of the DCK relay 510 to operate inhibits completion of the link functions and results in a time out and operation of the RL relay 507 to cause an alarm signal in the office.

When the cross points of the transfer trunk link 109 close, the C relay 516 operates in series with the TR relay 250 of the incoming trunk 100 over the CO conductor 249. Operation of the C relay 516 provides a holding path for the ON relay 502 which includes the negative potential source 517, the winding of the ON relay 502 and the make contact 518 of the C relay 516 to ground. Operation of the C relay 516, through the opening of its break contact 519, removes ground from the LO conductor 504 and the TF conductor 520 to release the relays in the transfer trunk line 109 from which the trunk frame number on which the incoming trunk terminates was received.

Operation of the C relay 516, through the opening of its break contacts 521, opens the resistance ground to the LK conductor 500 and thereby releases the link TP relay (not shown), and the removal of ground from the LO conductor 504 causes operation of the link RB relay (not shown) for the selected horizontal group.

Closure of the make contacts 400 of the C relay 516 and the make contact 401 of the DCK relay 510 closes the potential source 402 through resistance 403 and the break contact 404 of the CO relay 405 to place resistance battery on the ST conductor 600 to operate the TP relay (not shown) in the transfer register link 110. The transfer register link 110, as previously noted, is similar to a standard incoming register link; however, all of the TP relays in the transfer register link 110 are wired in a single chain circuit. This causes all transfer calls to be achieved on a one-at-a-time basis through the dial tone functions of the marker 105. Operation of the C relay 516, through closure of its make contacts 406, extends holding ground to the R conductor 603 to the transfer register link circuit 110. The transfer register link TP relay (not shown) operates a link RP relay (not shown) to seize a transfer register 111. C and CA relays (not shown) in the transfer register link 110 are operated through the link RP relay (not shown) and the CSC1 and CSC2 relays 607 and 608, respectively, over ground on the TPU conductor 609.

Figures 7, 8:
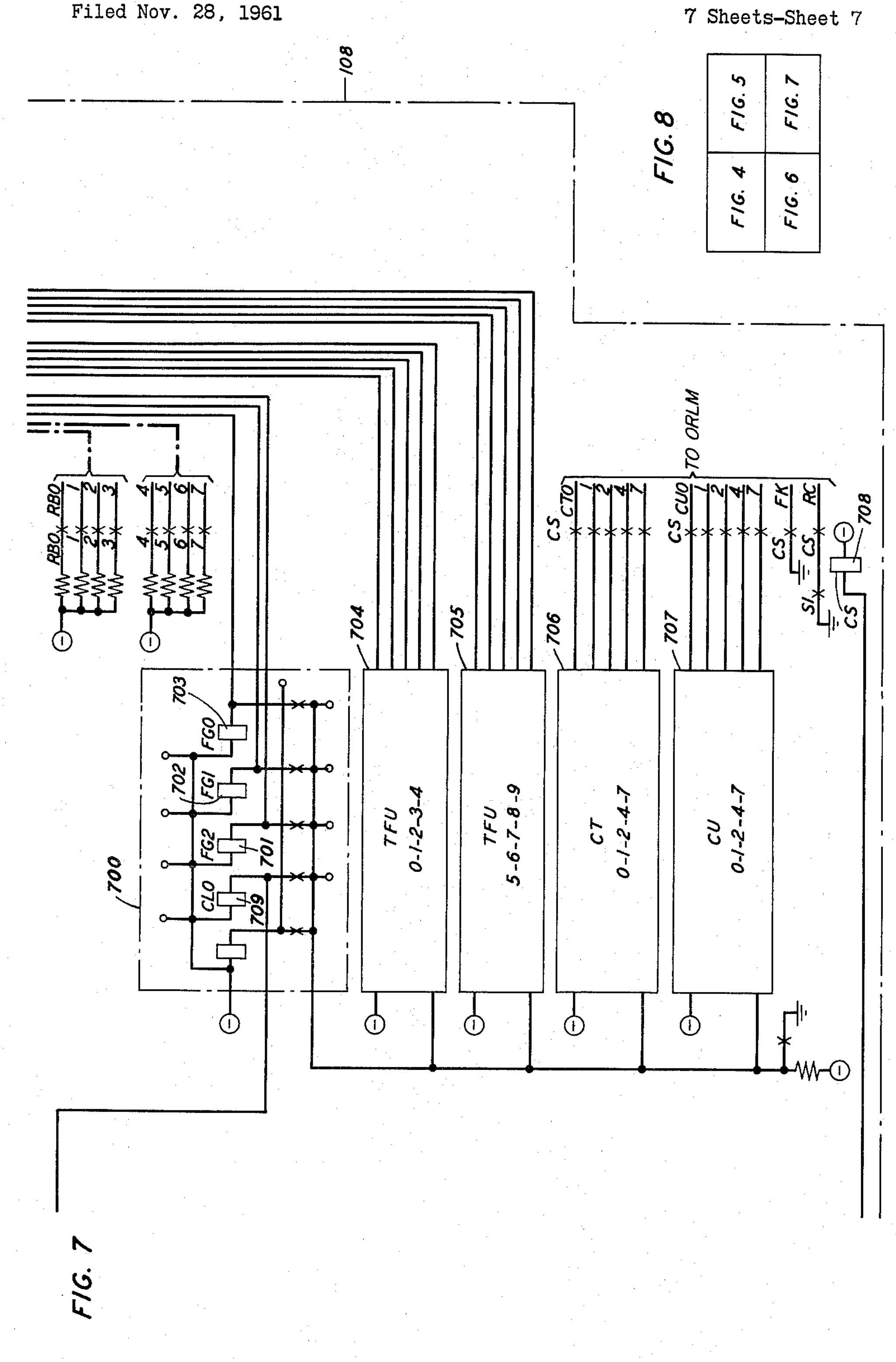
FIG. 8 shows the arrangement of FIGS. 4 through 7.

The CSC1 and CSC2 relays serve to transmit the trunk link frame location of the incoming trunk 100 and the class of service of the transferring extension 107 from the transfer trunk 108 to the transfer trunk register 111. In FIG. 7 there are shown a number of identical blocks, the details of which are shown at the top of FIG. 7 in the block labeled 700. Each of these blocks comprises five relays which are connected to operate upon the receipt of information from the transfer trunk link 109 and from the trunk link frame 103. These relays are arranged to lock over their make contacts and, thereby, information obtained from the transfer trunk link 109 and from the trunk link frame 103 is temporarily stored in these relays. The boxes labeled 704 through 707 each contain five relays arranged as shown in the block labeled 700. The first or upper block labeled 704 comprises the trunk frame tens relays 0 through 4. The second block labeled 705 comprises the trunk frame number relays labeled 5 through 9. The blocks labeled 706 and 707 comprise the class tens and the class units relays for registration of the class of service of the incoming trunk 100.

The contacts of the relays in the blocks labeled 700 and 704 through 707 are arranged as shown in the block labeled 610, and, as in FIG. 7, there are four additional blocks labeled 611 through 614 in which the details of the contacts are not shown. Ground is extended from the TPU conductor 609 through operated FG and TF relay contacts and contacts of the CSC1 and CSC2 connector relays 607 and 608 to transmit the trunk frame location of the incoming trunk 100 from the transfer trunk 108 to the transfer trunk register 111.

The class of service information relating to the originally called extension 102 is subsequently transferred through the contacts of the CS relay 708 when this information becomes available from the marker circuit 105.

The CO relay 405 operates from ground over the T conductor 601 and indicates that the transfer trunk register 111 is attached to the transfer trunk 108. Operation of the CO relay 405; (1) removes the potential source 402 from the start conductor 600 when its break contacts 404 become open; (2) removes the low resistance ground from the S conductor 247 when the break contacts 414 of the CO relay 405 open (the path for this ground was the break contacts 407 of the P relay 408, diode 409, resistor 410, the break contacts 414 of the CO relay 405 and conductor 247); (3) closes the FT and BT conductors 411 and 412 to the trunk link frame circuit to make the transfer trunk appear idle to a marker in establishing the dial tone and second talking connection 114; (4) places ground on the BL conductor 604 through its make contacts 413 to operate the register CK relay (which is not shown); and (5) by opening the break contacts 521, stops the timing of the RL timer.

At this time a continuous sleeve conductor connection exists between the transfer register 111 and the line link frame appearance of the originally called PBX extension 102 over a path shown in FIG. 1 which includes cross points and relay contacts in the transfer register link 110, the transfer trunk 108, the transfer trunk link 109, the incoming trunk 100, the trunk link frame 103, the first talking path 101 and the line link frame 104.

After the transfer register 111 has become attached to the originally called extension 102, it bids for an A.C. potential source 123 to mark the sleeve at the transfer trunk register 111 and thus place a distinctive identifying A.C. mark at the line link frame appearance of the originally called PBX extension 102 over the path just enumerated. The distinctive marking potential at the sleeve appearance of the originally called line on the line link frame 104 causes operation of the FMS relay 124 and initiates a bid for a marker 105 to establish a dial tone connection between the originally called extension 102 and the transfer trunk 108 over the second talk and dial tone path 114 and further enables the identifier 112 to permit identification of the originally called PBX extension 102.

The appearance of the marking potential at the line link frame appearance of the originally called extension 102 alerts the frame start to bid for the line identifier 112 and for the marker 105. The bid to the marker 105 indicates that a transfer connection is to be established and this causes a connector relay (not shown) within the marker 105 to attach the marker 105 to the identifier 112 over the information path 120. It is over this path that the identiefir 112 will pass to the marker 105 the vertical group, horizontal group and vertical file numbers which identify the location of the originally called extension 102 within the line link frame 104. The line link frame number and the class of service of the originally called line are transmitted from the line link frame 104 to the marker 105 via the line link marker connector 119 in the normal manner. The marker 105 then proceeds to effect a connection between the originally called extension 102, the identity of which has been stored in the marker 105, and the seized transfer trunk 108. It should be noted at this time that all transfer trunks, except the one which has been seized for this particular transfer, are made to appear busy and the marker 105 proceeds to effect a connection between the originally called extension 102 and an idle transfer trunk in the same manner that it effects a connection between a calling extension and an idle originating register. The marker 105 hunts for a trunk having ground on the FT conductor signifying that the trunk is available for a connection. The same condition exists in the hunt for an idle originating register. When a register is in use, the ground is removed from its equivalent of the FT conductor of the transfer trunk 108. As previously noted, transfer requests are handled on a one-at-a-time basis; therefore a CO relay 405 will be operated in only the transfer trunk which is currently served.

The dial tone and second talk path 114 is thus established by the marker 105 and a path is completed between the originally called extension 102 and the transfer register 111 through the line link frame 104, the dial tone and second talk path 114, the trunk link frame 103, the transfer trunk 108 and the transfer register link 110.

The class of service of the originally called extension 102 is transmitted from the marker 105 to the CT and CU relays 706 and 707 of the transfer trunk 108 and thence to the transfer register 111 in order to assure that the extension 107 is within the group to which transfers are permitted. Dial tone is returned to the originally called extension 102 and the party at that extension may proceed to dial a four-digit number representative of another extension within the PBX group to which the transfer is to be made. After the four-digits of the transfer extension have been registered in the transfer register 111, the number match connector 118 attaches the number match circuit 117 to the transfer register 111 to determine whether or not the extension to which the transfer is to be effected is, in fact, within the group to which transfers are permitted. This is accomplished by matching the dialed digits to the class of service of the originally called extension. If transfer to the indicated extension is permitted, the transfer register 111 bids for the marker 105 to establish a connection between the transfer extension 107 and the trunk link frame appearance 116 of the incoming trunk 100. After dialing is completed, the transfer register 111 has stored therein the number of the trunk link frame on which the incoming trunk 100 terminates (this item of information was temporarily stored in the relays 700 through 705 of the transfer trunk 108 and subsequently transferred through the CSC1 and CSC2 connector relays 607 and 608, respectively, to the transfer register 111) and the directory number of the extension to which the call is to be transferred. The marker 105 may then proceed to establish the third talking path 115. At this time the incoming trunk 100 and the originally called extension 102 are connected together through the transfer trunk 108, and the incoming trunk 100 is connected to the transfer extension 107 through the trunk link frame 103 on which the incoming trunk 100 terminates and the line link frame 104 on which the transfer extension 107 terminates.

At this time in the transfer procedure, a number of conditions may obtain with regard to the transfer extension 107. For example, the transfer extension 107 may be busy or may fail to answer and, in either event, the transfer cannot be completed or, if the transfer extension 107 answers, the originally called extension 102 may be dropped from the connection and thus the transfer apparatus may be free for subsequent use. In that completion of the transfer is the desired end, it will be first assumed that the transfer extension 107 answers the transferred call.

After the third talking connection 115 has been established, both the subscriber at the distant office connected through the incoming trunk 100 and the subscriber at the originally called extension 102 hear ringback tone. When the call is answered, the distant subscriber, the originally called subscriber, an dthe subscriber to which the call is transferred may talk for a period of approximately thirty seconds. In the course of registering the dial pulses and establishing the third talk path 115, the D relay 415 operated over a ground on the D conductor 602 and locked through its make contact 416, the make contact 417 of the B1 relay 418 and the make contact 413 of the CO relay 405. The operated D relay 415 completes the transmission path through its make contacts 419 and 420 between the incoming trunk 100 which is connected to the tip and ring conductors 245 and 246 and the originally called extension 102 which is connected over the second talk path 114 and the tip and ring conductors 421 and 422.

Upon answer of the call at the transfer extension 107, the S relay 423 will operate from a short on the tip and ring conductors 245 and 246. The operation of relay S 423 accomplishes the following functions: (1) changes the timing of the timing circuit from five seconds to thirty seconds by removing the TM3 resistor 525 from the circuit of the TM tube 529 and placing the TM4 resistor 526 in this circuit. This is accomplished by the opening of the break contact 527 and the closing of the make contact 528 of the S relay 423; (2) the T relay 424 operates through the closure of the make contact 425 of the S relay 423 over a path which is completed by the previously operated make contact 426 of the D relay 415.

As previously noted herein, calls may be completed to PBX extensions through the operator's console. That is, a subscriber may dial a number which causes him to reach an attendant's console and the attendant initiates a transfer to complete the call to the desired extension of the PBX. Answer supervision is provided in this type of service through operation of the T relay 424 of the transfer trunk. Operation of the T relay reverses battery from the A relay 427 to the attendant's console and therefore provides an answer signal to the attendant who may now disconnect the attendant's console from the transfer circuit without waiting for the normal thirty second time-out.

If the subscriber at the originally called extension 102 hangs up before the thirty second time-out occurs, the A relay 427, which was operated when the second talk path 114 was established, will release and, in turn, the B relay 428 which is directly under control of the make contact 429 of the A relay 427 will similarly release. Release of the B relay 428 removes the low resistance ground to the sleeve conductor 430. This ground was supplied over the break contact 431 of the TO relay 524, the resistor 432, the make contact 433 of the B relay 428 and the sleeve conductor 430. Removal of the low resistance ground from the sleeve conductor 430 will effect release of the second talk path 114 and will also effect release of the connection between the incoming trunk 100 and the transfer trunk 108 through the transfer register link 110.

In the event that the subscriber at the originally called extension 102 does not disconnect within the approximate thirty second time-out interval, the TO relay 524 will operate and the opening of its break contacts 431 will again remove low resistance ground from the sleeve conductor 430 and thus, similarly, cause release of the second talk path 114 and of the connection to the incoming trunk 100.

*Transfer Line Busy, Overflow or No Answer*

In the event that the extension to which the call is transferred is busy, does not answer or if traffic conditions within the system are such that the call cannot be completed, the subscriber at the originally called extension 102 may cancel the transfer attempt by dialing a digit "1." This will clear the tone (ringing, busy or overflow) and will release the connection between the incoming trunk 100 and the transfer extension 107. In the event of an overflow, a connection was not established between the incoming trunk 102 and the transfer extension 107; therefore, the only action required is the release of the tone.

In response to the dialing of the digit "1," the A relay 427 of the transfer trunk 108 will release and reoperate. When the A relay 427 releases, it closes a path for operating the slow release P relay 408. The operating path for the P relay 408 includes ground, a break contact 434 of the A relay 427, the break contact 435 of the TO relay 524, the break contact 436 of the P2 relay 437, the make contact 438 of the D relay 415, the break contact 439 of the P1 relay 440 and the winding of the P relay 408 to negative battery. When the A relay 427 reoperates, the closure of its make contacts 429 closes a path from ground to operate the P1 relay 440. This path includes ground, the make contact 429 of the A relay 427, break contact 441 of the P2 relay 437, the make contact 442 of the P relay 408, the make contact 443 of the CO relay 405, the break contact 444 of the P1 relay 440 and the winding of the P1 relay to negative battery. The P1 relay 440 locks operated over its make contact 445, the break contact 446 of the P2 relay 437 and the make contact 447 of the D relay 415 to ground. With the P and P1 relays operated and the P2 relay released, a short will be returned over the tip and ring conductors 245 and 246 to the incoming trunk to effect release of the hold magnet in the ringing selection switch. This, accordingly, removes the tone (ringing, busy or overflow) from the connection. The short on the tip and ring is accomplished by means of the make contact 448 of the P relay 408, the make contact 451 of the P1 relay 440 and the break contact 452 of the P2 relay 437. The short on the tip and ring conductors 245 and 246 will continue for the release period of the slow release P relay 408.

The short on the tip and ring conductors 245 and 246 serves to operate the S relay 218 in the incoming trunk 100 through the make contacts 255 and 256 of the TR relay 250. Operation of the S relay 218 provides a path for operating the slow release P1 relay 336 from ground through the make contact 335 of the S relay 218, the winding of the P1 relay 336, resistor 337 to the negative potential source 341. When the S relay 218 releases after the P relay 408 of the transfer trunk 108 has released, the P2 relay 338 of the incoming trunk 100 will operate over a path which includes ground, the break contact 339 of the S relay 218, the make contact 340 of the P1 relay 336, the winding of the P2 relay 338, resistor 337 and the negative potential source 341. As previously noted with respect to the detailed operation of the incoming trunk 100, on a transfer call, the TR relay 250 is operated at this time and concurrent operation of the P2 relay 338 serves to remove the holding path for the ringing selection switch. That is, the connection to the hold conductor 262 is opened by simultaneous operation of the TR and P2 relays and the opening of the break contact 257 of the TR relay 250 and the break contact 263 of the P2 relay 338.

A subsequent transfer attempt may be initiated by dialing another digit "1" which will initiate seizure of the transfer register 111. On the subsequent seizure, the transfer trunk 108 must signal the register 111 that the line identifier 112 will not be required in that the dial tone and second talk path 114 have been priorly established between the originally called extension 102 and the transfer trunk 108.

The A relay 427 follows the digit "1" pulse on the tip and ring conductors 421 and 422 and upon release of the A relay 427 in response to the dial pulse, the P2 relay 437 will opearte. The operating path is from ground through the break contact 434 of the A relay 427, the break contact 435 of the TO relay 524, the break contact 436 of the P2 relay 437, the make contact 438 of the D relay 415, the make contact 453 of the P1 relay 440 and the winding of the P2 relay 437 to negative battery. Reoperation of the A relay 427 upon completion of the digit "1" pulse will close a path for operating the P relay 408. This path includes ground, the make contact 429 of the A relay 427, the make contact 454 of the P2 relay 437 and the winding of the P relay 408 to negative battery. Operation of the P relay 408 removes the low resistance sleeve ground to the incoming trunk sleeve conductor 247 and operation of the P2 relay 437 removes the locking ground to the CO relay 405. Release of the CO relay 405 will release the D relay 415 and thereby close battery to the ST conductor 600 in the transfer register link circuit 110. Seizure of the transfer register 111 at this time is similar to its seizure as previously described; however, during the reseizure the class of service information is transmitted from transfer trunk 108 to the transfer register 111 as soon as CSC1 and CSC2 relays, 607 and 608, respectively, and the link C and CA relays (not shown) operate.

Operation of the P and P2 relays 408 and 437 in the transfer turnk 108 will cause operation of the CLO relay 709 which is one of the five relays in the box labeled 700. The operating path for the CLO relay 709 includes ground, the make contact 455 of the P2 relay 437, the make contact 456 of the P relay 408, the winding of the CLO relay 709 to negative battery. Operation of the CLO relay 709 grounds the CL conductor 615 which indicates to the transfer register 111 that this is a second attempt to complete a transfer and that the identifier 112 is not required to complete the call. The ground which is placed on the CL conductor 615 originates in the transfer register 111 and is transmitted via the TPU conductor 609 to make contacts 616 of the CLO relay 709.

Dial tone is thus returned to the subscriber at the originally called extension 102 who may then proceed to dial a number to which transfer is to be attempted. The remainder of the call proceeds as described hereinabove.

It is to tbe understood that the above described arrangements are but illustrative of the application of the principles of the invention. Numerous other arrangements may be devised by those skilled in the art without departing from the spirit and scope of the invention.

For example, in some instances it may be desirable to provide add-on conference service in addition to transfer service. In this event, the thirty second time-out feature is disabled and a three-way connection between the incoming trunk, the originally called subscriber and the transfer or add-on extension will persist until a party or parties hang up and thereby release the connection.

Further, although this invention has been described in the context of dial transfer of incoming calls, it is obvious that these same principles can be applied to dial transfer of outgoing calls through the use of outgoing trunks which have features corresponding to the incoming trunk described herein.

What is claimed is:

1. A telephone switching system comprising a plurality of communication paths, a switching network for selectively interconnecting said paths, common control means for selectively controlling said network to establish a first connection between a calling one and a called one of said paths, means responsive to a first discrete signal from one of said connected paths for causing said common control means to release said first connection and to establish a second connection between said calling and said called paths, and means responsive to subsequent call signaling information from one of said connected paths for causing said common control means to establish a third connection through said network between said connected paths and a third one of said paths.

2. A telephone switching system comprising a plurality of communication paths, a switching network for selectively interconnecting said paths, common control means responsive to call signaling information from a calling one of said paths for selectively controlling said switching network to establish a first connection between said calling one and a called one of said paths, means responsive to a first discrete signal from said called one of said paths for causing said control means to release said first connection and to establish a second connection through said network between said calling and said called paths, and means responsive to subsequent call signaling information from said called one of said paths for causing said common control to establish a third connection through said switching network between said calling path and a transfer path.

3. A telephone switching system in accordance with claim 2 wherein said subsequent call signaling information represents the directory number of said transfer path.

4. A telephone switching system in accordance with claim 2 wherein said second path includes a transfer trunk.

5. A telephone switching system in accordance with claim 2 wherein said transfer trunk includes time-out means for releasing said second connection.

6. A telephone switching system comprising a plurality of subscriber stations arranged in customer groups, a plurality of trunks, a switching network for selectively interconnecting said subscriber stations and said trunk, control means common to said groups of subscriber stations for selectively controlling said network, said common control means responsive to call signaling information from a calling one of said trunks for establishing a first connection through said network between said calling trunk and a called one of said stations, means responsive to a first discrete signal from said called station to initiate a request to transfer the calling trunk to a transfer extension, and inhibiting means for canceling said transfer request.

7. A telephone switching system serving a plurality of subscriber station groups comprising a plurality of trunks, a switching network for selectively interconnecting said stations and said trunks, common control means for selectively controlling said network to establish a first connection between one of said trunks and a called one of said subscriber stations, means responsive to an answer at said called station and to a subsequent discrete signal therefrom for causing said control means to release said first connection and to automatically establish a second connection between said one of said trunks and said one of said subscriber stations, said second connection including a transfer trunk, means for registering subsequent call signaling information from said one of said stations, said subsequent call signaling information comprising the directory number of a second one of said stations and said last named means including means to provide a bid signal to said common control means, said control means responsive to said bid signal and said registered subsequent call signaling information to establish a third connection between said trunk and the subscriber station having the directory number represented by said subsequent call signaling information.

8. A telephone switching ssytem in accordance with claim 7 wherein said system further comprises detecting means for examining the call signaling information stored in said registering means for generating a cancel signal and means in said transfer trunk responsive to said cancel signal for inhibiting said bid signal.

9. A telephone switching system comprising a plurality of subscriber station groups, a plurality of incoming trunks, a plurality of transfer trunks, a switching network on which said stations and said trunks terminate for selectively interconnecting said stations and said trunks, common control means for selectively controlling said network to establish a first connection between one of said incoming trunks and a called one of said subscriber stations, means in said one of said trunks responsive to a discrete signal from said called one of said stations for initiating a request signal for a transfer trunk, means responsive to said request signal for seizing and connecting an idle transfer trunk to said one of said trunks, transfer register means, means for connecting said transfer register to said seized transfer trunk, and potential means associated with said register means for transmitting a distinctive marking potential from said register means to said called one of said subscriber stations over a path which includes said transfer trunk, said incoming trunk and said first connection.

10. A telephone switching system in accordance with claim 9 wherein said system further comprises a line identifier, means in said switching network responsive to said discrete potential for effecting connection of said identifier to said switching network and for requesting the service of said common control means, said identifier responsive to said request and to said discrete marking potential for transmitting to said common control means the equipment location within said switching network of said called one of said stations, and said common control means including means to establish a second connection between said called one of said stations and said one of said incoming trunks in response to said signals of said identifier.

11. A telephone switching system comprising a plurality of subscriber station groups, a plurality of trunks, a switching network in which said stations and said trunks terminate for selectively interconnecting said stations and said trunks, common control means for selectively controlling said network to establish a first connection between a calling one of said trunks and a called one of said stations, means in said calling one of said trunks responsive to a discrete signal from said called one of said stations for causing said common control means to release said first connection and to automatically establish a second connection between said calling one of said trunks and said called one of said subscriber stations, said second connection including a transfer trunk, means for registering subsequent calling information from said called one of said stations, said registering means including means to provide a bid signal to said common control means, said control means responsive to said bid signal and said registered subsequent call signaling information to establish a third connection between said trunk and the subscriber station having the directory number represented by said subsequent call signaling information, and means in said transfer trunk responsive to a second discrete signal from said called one of said subscriber stations to effect release of said third connection and to prepare said transfer trunk to accept a subsequent transfer request.

12. A telephone switching system comprising a plurality of groups of PBX extensions, a plurality of incoming trunks, a switching network for selectively interconnecting said extensions and said trunks, common control means responsive to call signaling information from a calling one of said trunks for establishing a first connection through said network between said calling trunk and a called extension of one of said groups, means responsive to a first discrete signal from said called extension for causing said common control means to release said first connection through said network and to establish a second connection between said calling trunk and said called extension, and means responsive to subsequent call signaling information from said called extension for causing said common control means to establish a third connection through said network between said incoming trunk and another extension of said one group of extensions.

13. A telephone switching system in accordance with claim 12 wherein said system further comprises means responsive to a second discrete signal from said called extension for releasing said third connection.

14. A telephone switching system in accordance with claim 12 wherein said first discrete signal comprises an answer at said called extension and a dialed digit 1.

15. A telephone switching system in accordance with claim 12 wherein said second discrete signal comprises a dialed digit 1.

16. A telephone switching system in accordance with claim 12 wherein said second connection includes a transfer trunk, said transfer trunk having an appearance on said switching network for establishing said third connection.

17. A telephone switching system in accordance with claim 12 wherein said system further comprises number matching means for examining said subsequent call signaling information, said number matching means including means to inhibit establishment of said third connection if said subsequent call signaling information does not represent the directory number of an extension within said one group of extensions.

18. A telephone switching system comprising a plurality of groups of PBX extensions, a plurality of incoming trunks, a switching network for interconnecting said extensions and said trunks, common control means responsive to call signaling information from one of said incoming trunks for establishing connection through said network between said one of said incoming trunks and a called one of said extensions, means in said incoming trunk responsive to an answer at said called one of said extensions and a subsequent discrete signal from said called extension for generating a request for transfer signal, a plurality of transfer trunks, and a transfer trunk link responsive to said request for transfer signal for establishing a connection between said one of said incoming trunks and an idle one of said transfer trunks.

19. A telephone switching system in accordance with claim 18 wherein said transfer trunk includes register means for storing the location on said switching network where said one of said incoming trunks terminates.

20. A telephone switching system comprising a first telephone line, a transfer telephone line, a first trunk, means for establishing a first connection from said first trunk to said first telephone line, a transfer trunk, means under control of said first telephone line for establishing a second connection through said transfer trunk between said first trunk and said first telephone line and for releasing said first connection, and means under control of said first telephone line for establishing a connection from said first trunk to said transfer telephone line.

21. A telephone switching system in accordance with claim 20 further comprising means for releasing said second connection after establishment of said third connection.

22. A telephone switching system in accordance with claim 20 further comprising means under control of said first telephone line for releasing said means for establishing said third connection.

23. A telephone switching system comprising a line link frame, a trunk link frame, a plurality of telephone lines having appearances on said line link frame, an incoming trunk and a transfer trunk having appearances on said trunk link frame, common control means for establishing a first connection from said incoming trunk through said line and trunk link frames to a first telephone line, means under control of said first telephone line for establishing a second connection through said trunk and line link frames and said transfer trunk to said incoming trunk, means for releasing said first connection, means for receiving call signaling information from said first telephone line identifying a second telephone line, and common control means responsive to said call signaling information for establishing a third connection from said incoming trunk through said trunk and line link frames to said second telephone line.

24. A telephone switching system in accordance with claim 23 further comprising means for releasing said second connection and said transfer trunk after establishment of said third connection.

25. A telephone switching system in accordance with claim 24 further comprising means responsive to an additional call signal from said first telephone line for releasing said means for establishing said third connection.

26. A telephone switching system in accordance with claim 25 further comprising means for examining said call signal information and means responsive to said examining means for inhibiting establishment of said third connection.

27. A telephone switching system in accordance with claim 26 wherein said transfer trunk includes register means for storing the identification of said trunk link frame.

28. A telephone switching system in accordance with claim 24 wherein said means for releasing said second connection and said transfer trunk includes timing means.

29. A telephone switching system in accordance with claim 23 wherein said means for establishing said second connection includes a line identifier, means for effecting connection of said line identifier to said line link frame and means responsive to said identifier for establishing said second connection to said first line through said line link frame.

No references cited.

Notice of Adverse Decision in Interference

In Interference No. 94,364 involving Patent No. 3,115,552, E. R. Fulwiler, R. L. Hayes, E. D. Masucci and W. M. Wilson, TELEPHONE SWITCHING SYSTEM, final judgment adverse to the patentees was rendered Oct. 26, 1965, as to claims 1 and 6.

[*Official Gazette February 15, 1966.*]